United States Patent
Young

(10) Patent No.: US 6,276,882 B1
(45) Date of Patent: Aug. 21, 2001

(54) MOUNTING CHANNEL MEMBER AND MOUNTING CHANNEL MEMBER ASSEMBLY AND ANCHOR FASTENER THEREFOR

(76) Inventor: Richard E. Young, 44 Lakeside Crescent, Lancaster, NY (US) 14086

( * ) Notice: Subject to any disclaimer, the term of this patent is extended or adjusted under 35 U.S.C. 154(b) by 0 days.

(21) Appl. No.: 09/609,235

(22) Filed: Jun. 30, 2000

Related U.S. Application Data

(63) Continuation of application No. 09/122,923, filed on Jul. 27, 1998, now Pat. No. 6,116,435.

(51) Int. Cl.$^7$ .............................. F16B 13/06; F16B 37/04
(52) U.S. Cl. ..................... 411/60.2; 411/55; 411/80.5; 411/182
(58) Field of Search ................. 411/55, 61, 60.1, 411/60.2, 80.5, 182, 80.6

(56) References Cited

U.S. PATENT DOCUMENTS

| | | | |
|---|---|---|---|
| 1,499,072 | 6/1924 | Pleister | 411/80.5 |
| 1,751,818 | 3/1930 | Karitzky | 411/80.5 |
| 2,971,653 | 2/1961 | Shaw | 211/94.01 |
| 3,045,961 | 7/1962 | Cygan | 248/220.21 X |
| 3,112,912 | 12/1963 | Alvarez | 211/94.01 X |
| 3,516,324 | 6/1970 | Berner | 411/80.5 |
| 3,826,458 | 7/1974 | Fisher | 248/220.5 |
| 4,070,945 * | 1/1978 | Kurosaki | 411/182 |
| 4,500,238 * | 2/1985 | Vassiliou | 411/61 X |
| 4,591,058 | 5/1986 | Amstutz et al. | 211/94.01 |
| 4,614,471 | 9/1986 | Mauritz | 411/60 X |
| 4,615,448 | 10/1986 | Johnsonbaugh | 211/94.01 |
| 4,629,076 | 12/1986 | Amstutz et al. | 211/94.01 |
| 4,678,151 | 7/1987 | Radek | 211/59.1 |
| 4,726,554 | 2/1988 | Sorrell | 211/59.1 |
| 4,765,788 * | 8/1988 | Nowak et al. | 411/61 |
| 4,882,868 | 11/1989 | Fast | 211/59.1 |
| 4,883,394 * | 11/1989 | Van der Woude et al. | 411/80.5 X |
| 4,917,426 * | 4/1990 | Lopp | 411/182 X |
| 5,065,490 | 11/1991 | Wivagg et al. | 411/55 X |
| 5,101,989 | 4/1992 | Jones | 211/94.01 |
| 5,392,562 | 2/1995 | Carambula | 248/300 X |
| 5,452,139 | 9/1995 | Schrott | 248/475.1 |
| 5,580,203 | 12/1996 | Read et al. | 411/508 |
| 5,582,376 | 12/1996 | Thompson | 248/225.11 X |
| 5,657,885 | 8/1997 | White et al. | 211/94.01 |
| 5,706,559 | 1/1998 | Oliver et al. | 24/297 |
| 5,746,559 | 5/1998 | Shirai | 411/182 |
| 5,775,521 | 7/1998 | Tisbo | 211/94.01 |

\* cited by examiner

*Primary Examiner*—Neill Wilson
(74) *Attorney, Agent, or Firm*—Joseph P. Gastel

(57) ABSTRACT

A mounting channel member including a body having an outer surface, a pair of side edges and a pair of ends and a plurality of undercut channels extending away from the outer surface. A mounting channel member assembly wherein a plurality of mounting channel members are mounted on a supporting surface in side-by-side relationship. An anchor fastener including a body having an upper body portion and a lower body portion secured to the upper body portion, a bore in the upper body portion, and the lower body portion including first and second legs with a space therebetween with the bore being aligned with the space.

27 Claims, 4 Drawing Sheets

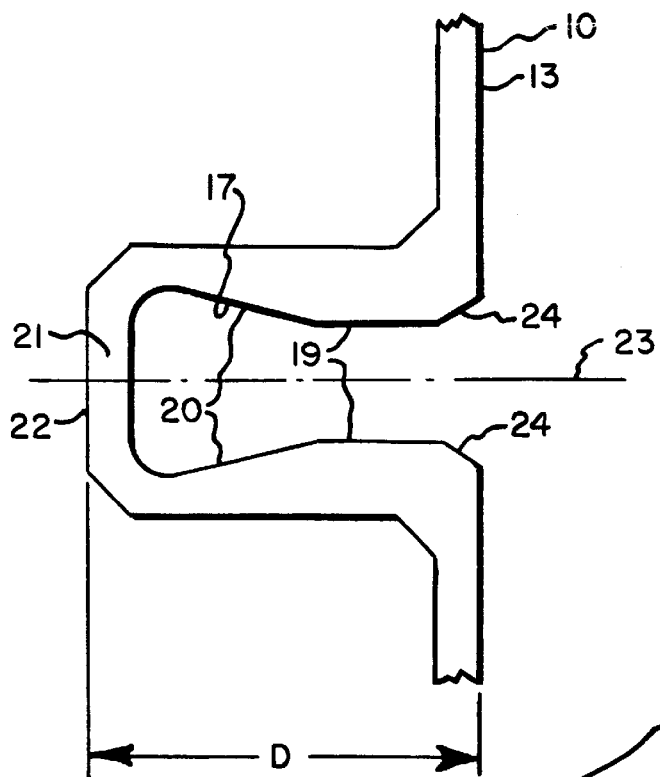
Fig. 6.
Fig. 5.
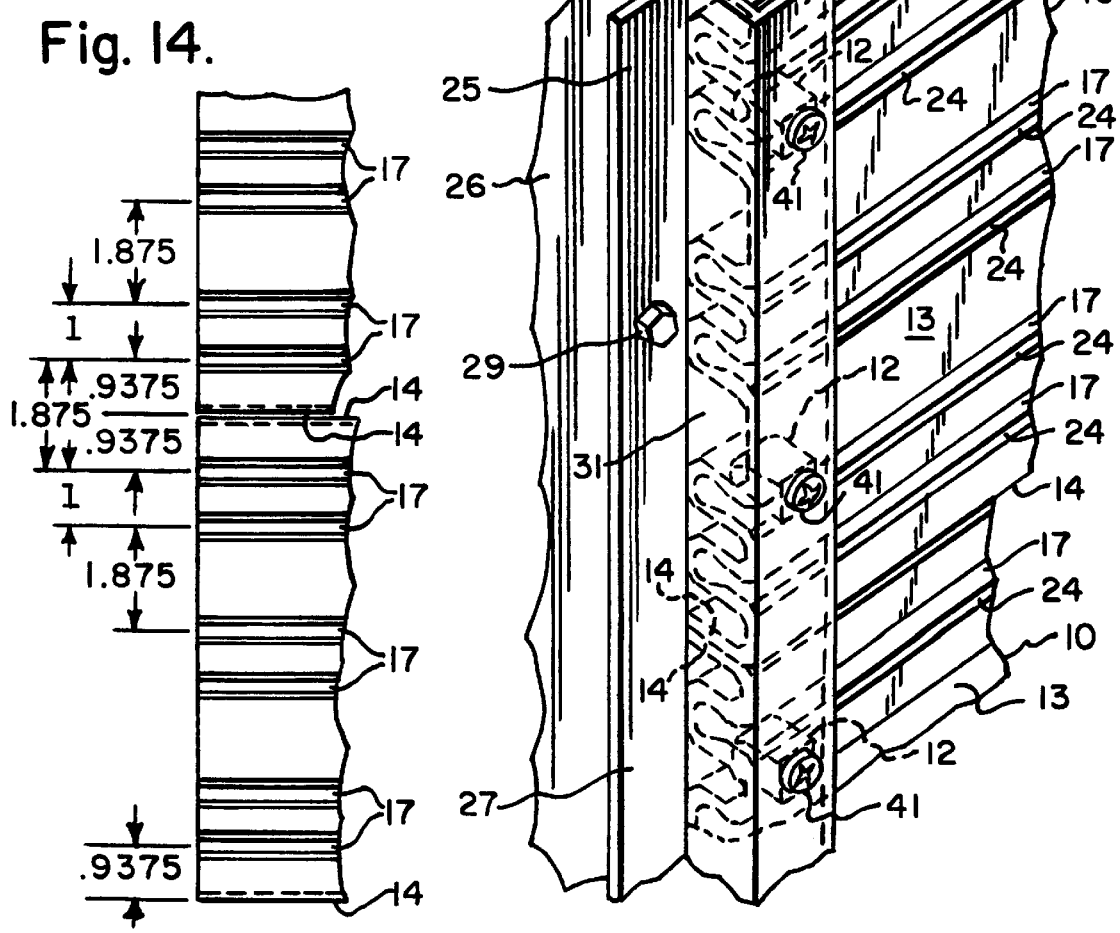
Fig. 14.

MOUNTING CHANNEL MEMBER AND MOUNTING CHANNEL MEMBER ASSEMBLY AND ANCHOR FASTENER THEREFOR

CROSS-REFERENCE TO RELATED APPLICATIONS

The present application is a continuation of application Ser. No. 09/122,923, filed Jul. 27, 1998. U.S. Pat. No. 6,116,435.

STATEMENT REGARDING FEDERALLY SPONSORED RESEARCH OR DEVELOPMENT

Not Applicable

BACKGROUND OF THE INVENTION

The present invention relates to a mounting channel member and a mounting channel member assembly and to an anchor fastener therefor.

By way of background, there are numerous structures for mounting members onto a wall or ceiling. However, insofar as known, there are no mounting channel members which have a plurality of substantially parallel spaced channels which receive fasteners, nor are there mounting channel member assemblies wherein a plurality of mounting channel members are placed in side-by-side relationship and secured to a wall or ceiling, nor are there specialized types of anchor fasteners which can be inserted directly in it to a channel and thereafter expanded to fit the channel and removed for reuse as desired.

BRIEF SUMMARY OF THE INVENTION

It is one object of the present invention to provide a mounting channel member having a plurality of substantially parallel channels therein which are capable of receiving anchor fasteners.

Another object of the present invention is to provide a mounting channel member assembly wherein a plurality of mounting channel members each having a plurality of substantially parallel channels therein are mounted in side-by-side relationship on a supporting wall or ceiling.

A further object of the present invention is to provide an improved anchor fastener which can be inserted directly into a channel and thereafter expanded to retain an external body in mounted relationship on a mounting channel member and which can be removed and reused. Other objects and attendant advantages of the present invention will readily be perceived hereafter.

The present invention relates to a mounting channel member comprising a body having an outer surface and a pair of side edges and a pair of ends, and a plurality of undercut channels extending away from said outer surface.

The present invention also relates to a mounting channel member assembly comprising a plurality of mounting channel members each having an outer surface and a pair of side edges and first and second ends, a plurality of undercut channels extending away from each of said outer surfaces, and said plurality of mounting channel members being oriented with said side edges in side-by-side adjacent relationship.

The present invention also relates to an anchor fastener comprising a body having an upper body portion and a lower body portion secured to said upper body portion, a bore in said upper body portion, said lower body portion comprising first and second legs with a space therebetween, and said bore being aligned with said space.

The present invention also relates to a mounting channel member and anchor fastener combination, said mounting channel member comprising an outer surface, a channel extending away from said outer surface and having a first pair of substantially parallel sides merging into a pair of diverging sides, and said anchor fastener comprising a body portion having a second pair of substantially parallel sides which fit between said first pair of substantially parallel sides, and a pair of spaced legs having outer surfaces, a bore in said body portion, and a screw which is held in said bore and extends into said space between said legs to force said outer surfaces of said legs into engagement with said diverging sides.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 5 is a fragmentary enlarged perspective view showing the Z-bracket and adjacent mounting channel members of FIG. 4;

FIG. 6 is an enlarged fragmentary view of the channel configuration of the mounting channel member;

FIG. 14 is a fragmentary plan view of adjacent mounting channel members showing the distances between the centerlines of the various channels of each mounting channel member and between adjacent mounting channel members.

DETAILED DESCRIPTION OF THE INVENTION

Summarizing briefly in advance, the present invention relates to (1) a mounting channel member 10 and (2) a mounting channel member assembly 11 consisting of a plurality of mounting channel members 10 placed side-by-side and mounted on a supporting surface, and (3) an anchor fastener 12 for fastening foreign objects to a mounting channel member 10.

Figure 1:
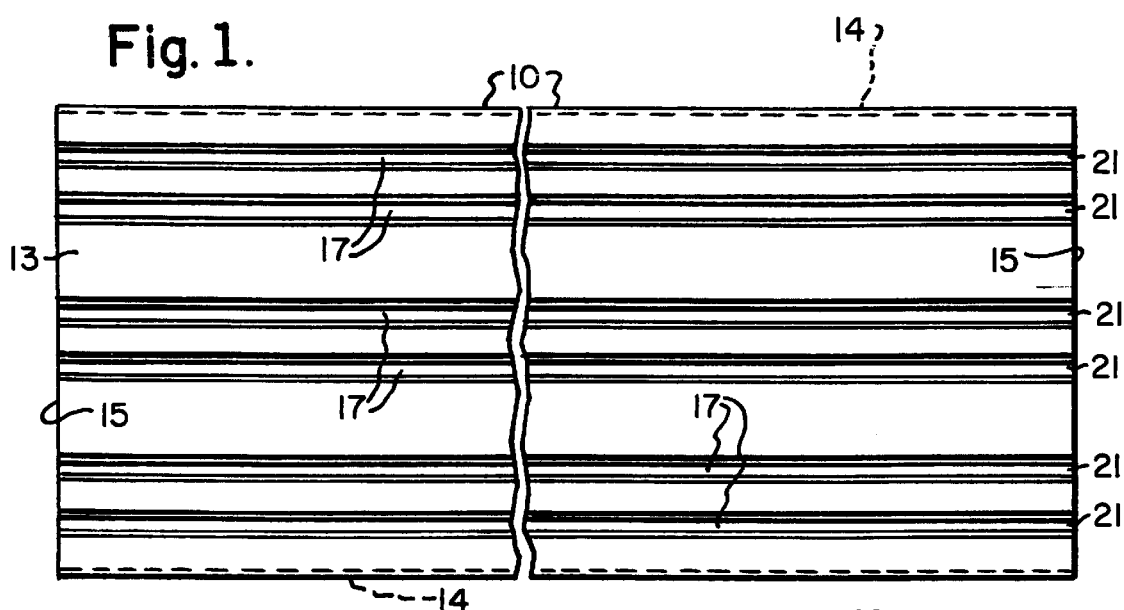
FIG. 1 is a fragmentary plan view of a mounting channel member of the present invention.
Figure 3:
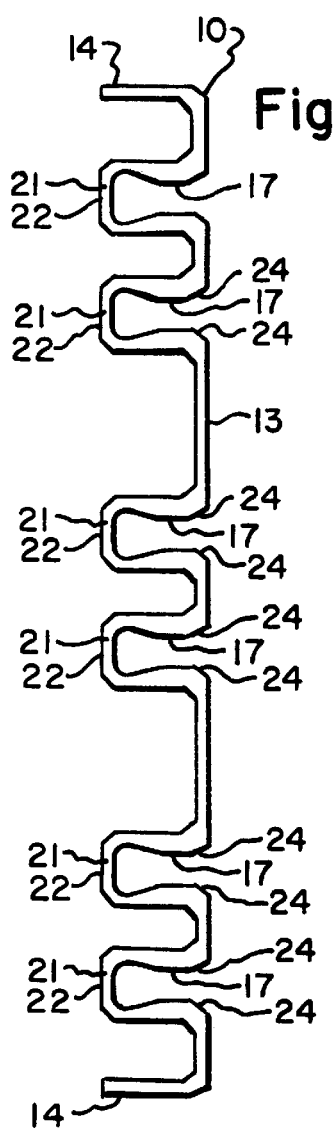
FIG. 3 is an end elevational view taken substantially in the direction of arrows 3—3 of FIG. 2.
Figure 2:
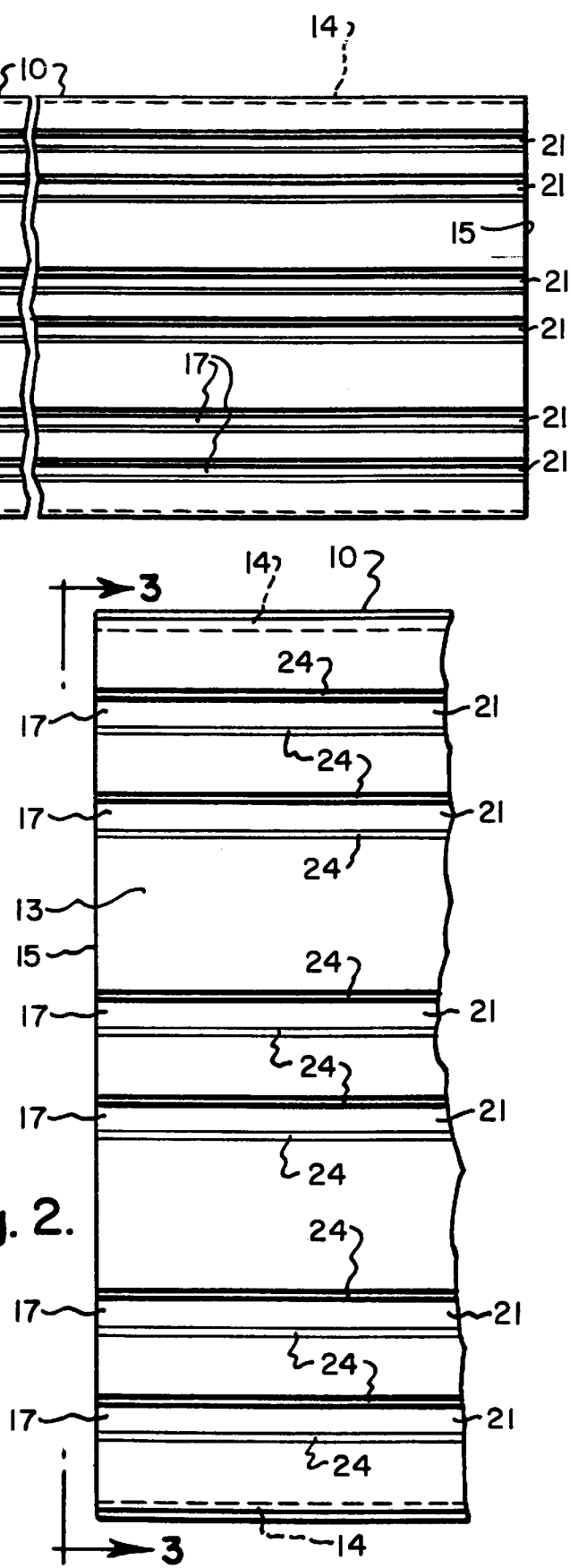
FIG. 2 is an enlarged fragmentary plan view of a portion of FIG. 1.

The mounting channel member 10 is an extruded aluminum member which is fabricated in ten-foot lengths, and it can be used in the ten-foot lengths or can be cut to shorter lengths. Each mounting channel member 10 includes an outer surface 13 having a pair of side edges 14 and a pair of ends 15. A plurality of undercut channels 17 extend away from the outer surface 13. Each undercut channel 17 (FIG. 6) includes a pair of spaced parallel sides 19 which merge into diverging sides 20. The channels also have a bottom wall 21, the outer sides 22 of which all lie in the same plane. Each channel 17 is symmetrical about centerline 23. There are beveled junctions 24 between spaced sides 19 and outer surface 13. In an actual model, the dimension D (FIG. 6) is 0.891 inches, and FIG. 6 is drawn to scale and the angular relationship of the above-enumerated parts are accurately represented. The mounting channel member 10 is approximately 8⅝ inches across outer sides 14. As can be seen from FIG. 1, there are three pairs of channels 17 in each mounting channel member. In an actual device, as shown in FIG. 14, the centerlines between the channels 17 of a pair of close channels 17 are one inch apart, and the distance between the closest channels 17 of adjacent pairs of channels is 1.875 inches. The centerlines of the uppermost and lowermost channels 17 of each channel member 10 are 0.9375 inches from sides 14 (FIG. 14). The foregoing spacing provides different distances among the six channels 17 of each channel member 10 for receiving fasteners for attaching objects to each channel member 10.

Figure 4:
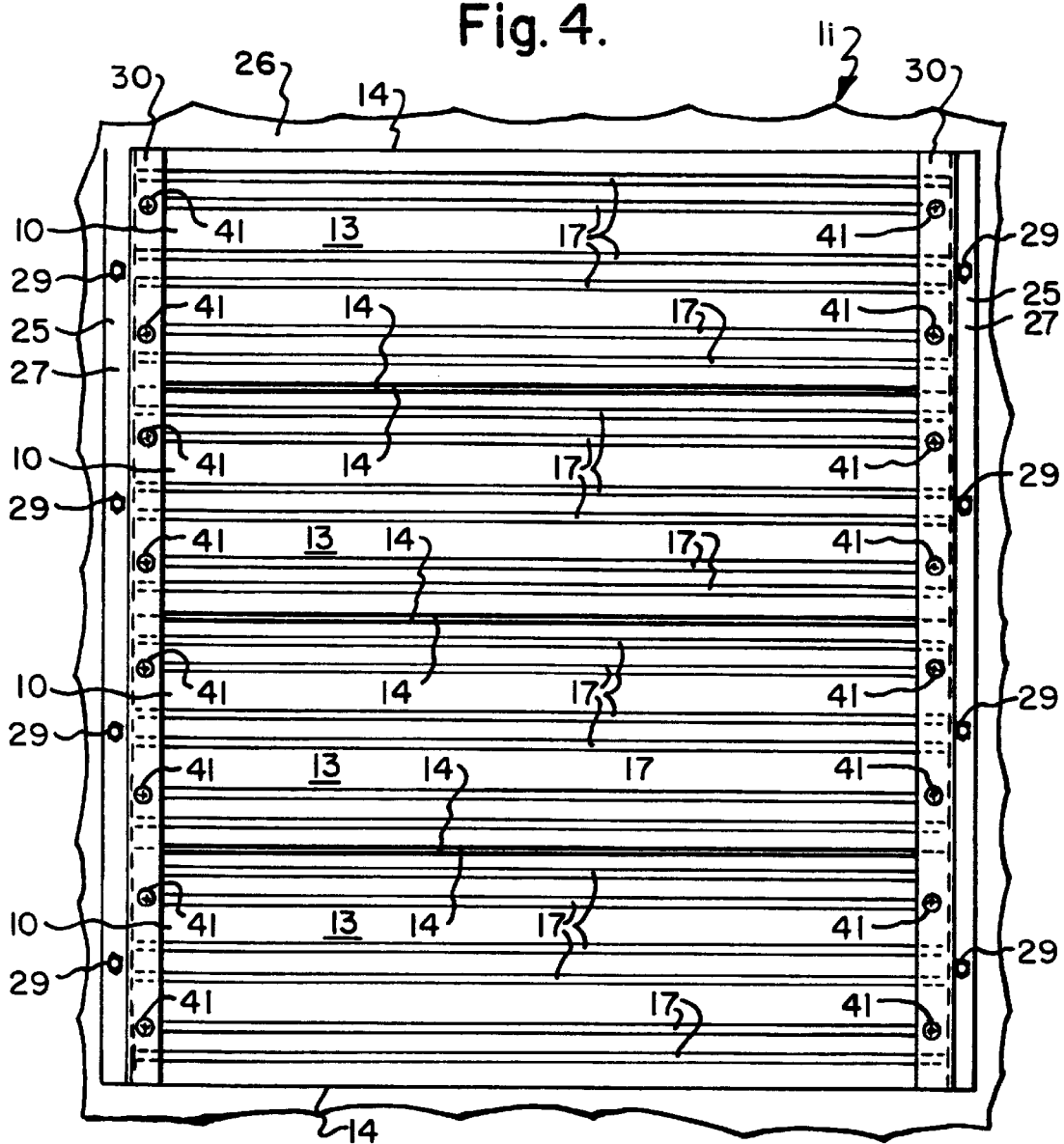
FIG. 4 is a fragmentary plan view of a mounting channel member assembly comprising a plurality of mounting channel members oriented with their side edges in adjacent relationship and mounted on a wall.

One possible configuration of a channel member assembly 11 (FIG. 4) consists of four channel members 10 of any desired length, for example, 2½ feet, placed with their sides 14 adjacent to each other and mounted on a wall 26 by a pair of Z-brackets 25 (FIGS. 4 and 5). As noted from the above dimensions shown in FIG. 14, when the mounting channel members 10 are placed with sides 14 adjacent each other, the distance between the centerlines of the closest channels 17 on the opposite sides of sides 14 is 1.875 inches which is the same as the distance 1.875 inches between the centerlines of the closest channels 17 of adjacent pairs of channels. Thus, in an assembly 11 there is a uniform pattern of all of the channels 17, that is, there is a spacing of one inch between two channels of a pair, and there is a spacing of 1.875 inches between all of the pairs of channels 17 of assembly 11.

Each Z-bracket has a leg 27 fastened to wall 24 by screws 29 and a leg 30 which is connected to leg 25 by web 31. Each leg 30 bears on the outer surfaces 13 of mounting channel members 10. Additionally, each mounting channel member 10 is fastened to each leg 30 by a plurality of anchor fasteners 12 which function in a manner which is described in detail hereafter.

The anchor fastener 12 (FIGS. 8–12) which is utilized to fasten a foreign object 31 (FIG. 12) to a mounting channel member 10 consists of an upper body portion 32 and a lower body portion 33 having spaced legs 34. The upper body portion 32 includes a pair of triangular flanges 35 which fit in complementary mating relationship to beveled surfaces 24 (FIGS. 11 and 12) when the anchor fastener 12 is in a fully installed position in a channel 17.

The outer sides 37 of each fastener 12 (FIG. 7) are spaced from each other slightly less than the distance between the sides 19 (FIG. 6) of the channel 17 so that the anchor fastener 12 can be inserted into a channel 17 at any part of the channel by merely inserting it perpendicularly to the outer surface 13. In an actual device, sides 37 were spaced 0.274 inches apart and sides 19 of the channel were spaced 0.281 inches apart. The anchor fastener, as shown in FIGS. 7–10, is drawn to scale.

The upper body portion 32 includes a bore 40 for receiving a screw 41. The diameter of bore 40 is equal to the outer diameter of screw 41. A plurality of ribs or strips 42 extend inwardly into bore 40. The inner edges of ribs 42 lie on a diameter which is equal to the root diameter of screw 41. Thus when screw 41 is threaded into bore 40, it taps through ribs 42 without threading into the sides of bore 40. The ribs provide the easy gripping surfaces when screw 41 is threaded into bore 40. The spacing 46 between legs 34 is less than the root diameter of screw 41, and it is this dimensioning which forces the legs 34 apart when screw 41 is in the position of FIG. 12.

Figure 11:
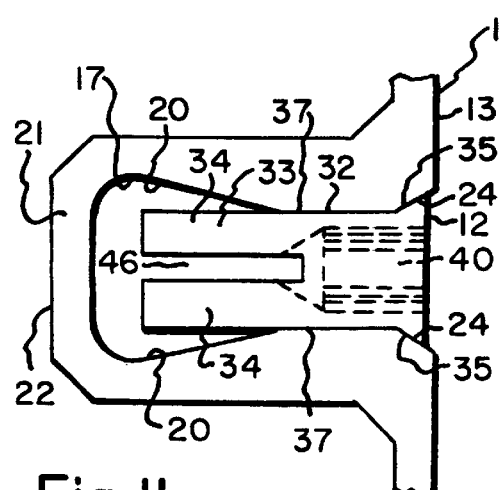
FIG. 11 is a fragmentary end elevational view of the channel of the mounting channel member with an anchor fastener therein before the anchor fastener member has been expanded into locking engagement with the channel.
Figure 12:
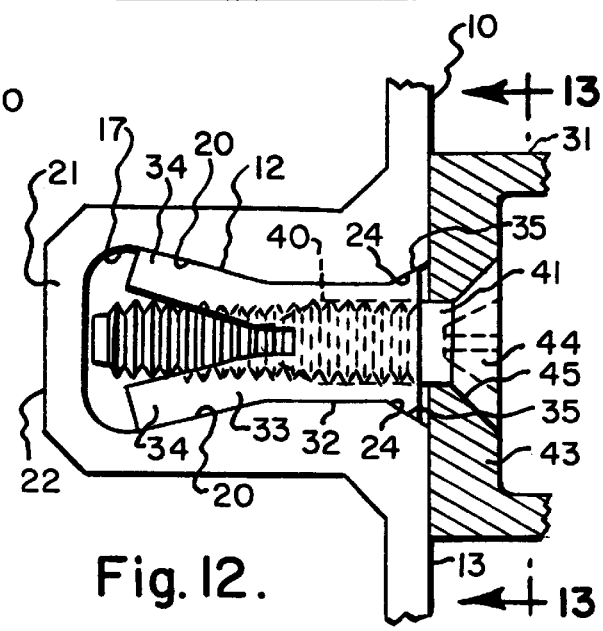
FIG. 12 is a fragmentary view of a channel with an anchor fastener therein which has been expanded into locking engagement with the channel by a screw which attaches a bracket to the mounting channel member.

After the anchor fastener has been inserted into a channel 17 to the position shown in FIG. 11, as screw 41 is threaded through bore 40 to the position of FIG. 12, it will force legs 34 apart so that they will move from their parallel position of FIG. 11 to the expanded position of FIG. 12 and thus force the outer sides of legs 34 into engagement with the diverging sides 20 of channel 17. As can be seen from a comparison of FIGS. 11 and 12 and as noted above, the space 46 between legs 34 is smaller than the diameter of screw 41, and it is this relationship which forces legs 34 to the position of FIG. 12 when screw 41 is in its final position.

The anchor fastener 12 is fabricated from high impact nylon with approximately 33% of glass fibers. The nylon is known under the trade name CELANESE 7523 and it is a product of the Ticona Company. The 33% glass fibers are approximately 0.0007 inches in diameter and are chopped into approximately 0.125 inch lengths and are distributed in a random manner within the body of the anchor fastener 12. The foregoing composition of the anchor fastener serves a plurality of purposes. In this respect, the nylon will not extrude when it is forced into the position of FIG. 12 by screw 41. In addition, the memory of the anchor fastener is such that when screw 41 is removed, the legs 34 will return substantially to the position shown in FIG. 11, to thereby permit the anchor fastener 12 to be withdrawn directly outwardly from channel 17 for reuse.

Figure 13:
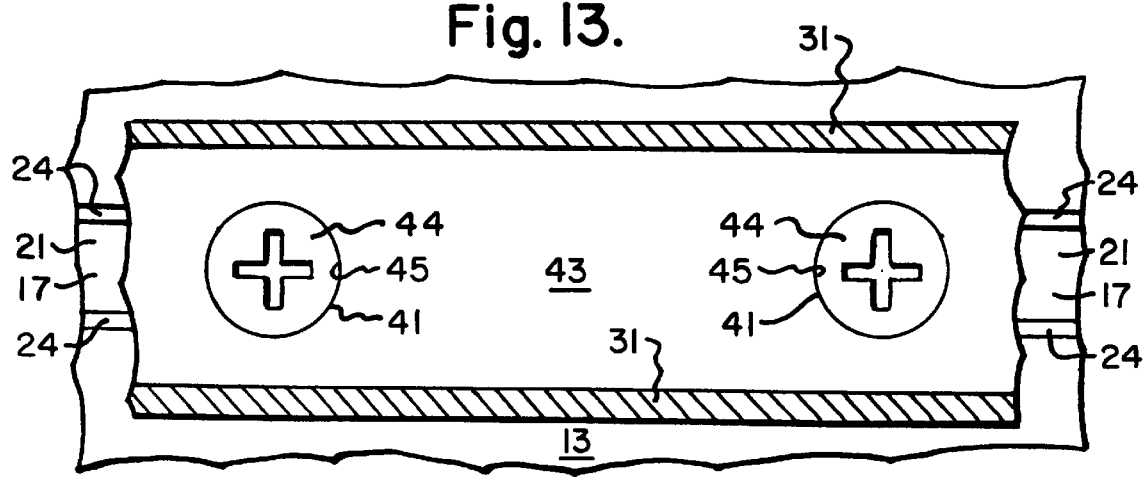
FIG. 13 is a fragmentary view taken substantially in the direction of arrows 13—13 of FIG. 12.
Figure 8:
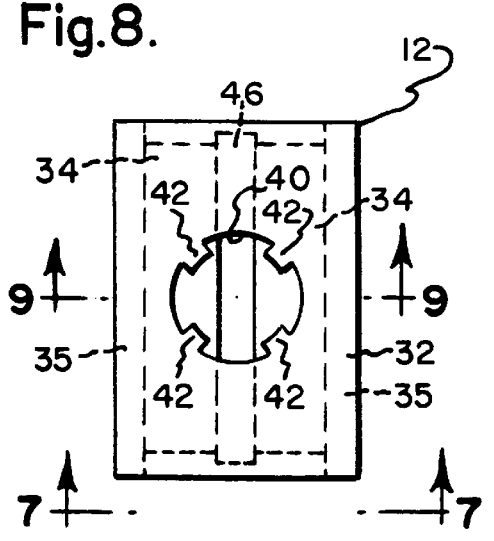
FIG. 8 is a plan view of the anchor fastener taken substantially in the direction of arrows 8—8 of FIG. 7.
Figure 7:
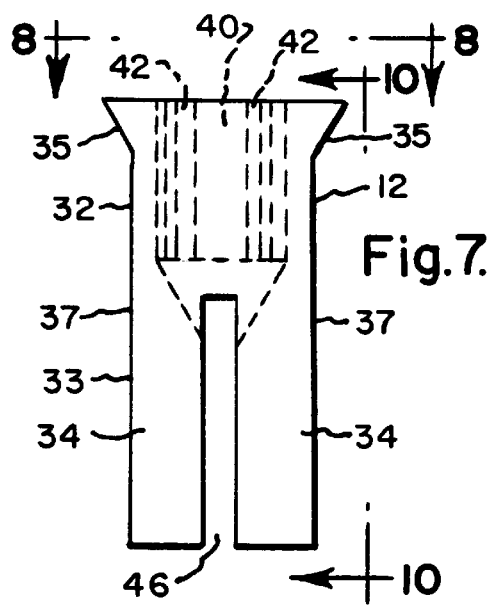
FIG. 7 is an end elevational view of an anchor fastener.
Figure 9:
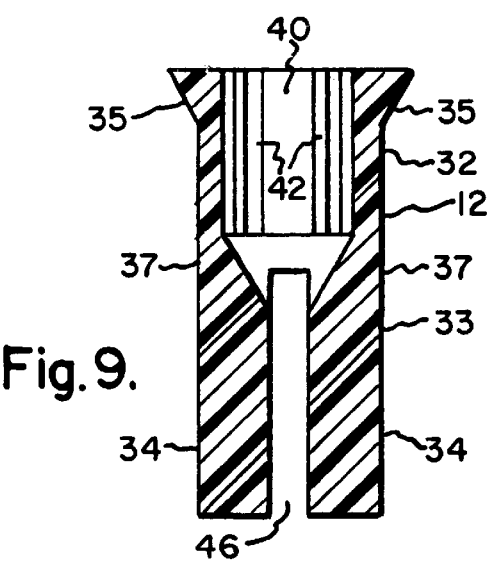
FIG. 9 is a cross sectional view of the anchor fastener taken substantially along line 9—9 of FIG. 8.
Figure 10:
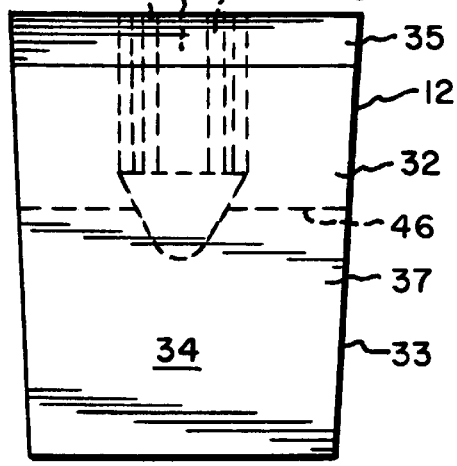
FIG. 10 is a side elevational view of the anchor fastener taken substantially in the direction of arrows 10—10 of FIG. 7.

As can be seen from FIGS. 12 and 13, the screws 41 are utilized to secure a foreign body 31 to surface 13 of channel member 10. The screws pass through base 43 of foreign body 41 and the heads 44 of screws 41 are received in countersunk holes 45 of body 31. While FIG. 13 shows both fasteners 12 in a single channel 17, it will be appreciated that the base 43 can be oriented crosswise of channels 17 so that the fasteners 12 may be located in a plurality of channels, depending on the spacing between the holes in base 43. In this respect, considering the above spacing among the plurality of channels 17, by properly spacing the holes 45 in a base 43, the base 43 can be mounted perpendicularly to the channels 17 or at 45 degrees relative to channels 17, either in a single mounting channel member 10 or across adjacent mounting channel members 10, as oriented in FIG. 4. In the latter respect, a base 43 can bridge the 1.875 inch space across the edges 14 of adjacent channels in the same manner as it can bridge the 1.875 inch space between adjacent channels 17 within a single mounting channel member 10.

While FIGS. 1–4 have shown the mounting channel members 10 oriented with the channels 17 oriented horizontally on a wall, it will be appreciated that the channels may be oriented vertically or at any desired angle. Also, while the mounting channel members 10 have been shown in FIG. 4 as being mounted on a wall, it will be appreciated that they can also be mounted on a ceiling, and further, the channel members 10 are sufficiently rigid so that they can be the walls by merely fastening them to studs by suitable screws which pass through bottom walls 21 of channels 17, or by the use of suitable adhesive.

It will be appreciated that the above-discussed dimensions are by way of example and not of limitation, and other dimensions can be used within the scope of the present invention.

While preferred embodiments of the present invention have been disclosed, it will be appreciated that the present invention is not limited thereto, but can be otherwise embodied within the scope of the following claims.

What is claimed is:

1. An anchor fastener comprising a body having an upper body portion and a lower body portion secured to said upper body portion, said upper and lower body portions having a lateral dimension and a width dimension substantially perpendicular to said lateral dimension, a bore in said upper body portion, said lower body portion comprising first and second legs with a space therebetween, said bore being aligned with said space, outer surfaces on said legs, said outer surfaces having a lateral dimension which is larger than said width dimension, and at least one strip extending inwardly into said bore from the side thereof.

2. An anchor fastener as set forth in claim 1 wherein said legs are spaced closer to each other than the diameter of said bore.

3. An anchor fastener as set forth in claim 1 including at least one flange extending outwardly from the upper portion of said upper body portion.

4. An anchor fastener as set forth in claim 1 including a screw in said bore.

5. An anchor fastener as set forth in claim 4 wherein said screw has an outer diameter which is equal to the diameter of said bore.

6. An anchor fastener as set forth in claim 4 wherein said legs are spaced closer to each other than the diameter of said screw.

7. An anchor fastener as set forth in claim 5 including at least one flange extending outwardly from the upper portion of said upper body portion.

8. An anchor fastener as set forth in claim 1 wherein said body is fabricated from material which has a memory which causes said outer surfaces of said legs to assume a dimension which is not substantially wider than said width dimension when they are not forced apart.

9. An anchor fastener as set forth in claim 1 including a screw in said bore, said screw having a larger diameter than said space so as to spread said legs when said screw enters said space, said body being fabricated from material which has a memory which causes said outer surfaces of said legs to assume a dimension which is not substantially wider than said width dimension when they are not forced apart.

10. An anchor fastener as set forth in claim 1 wherein said outer surfaces are substantially planar.

11. An anchor fastener as set forth in claim 1 wherein at least one of said outer surfaces is substantially planar.

12. An anchor fastener as set forth in claim 11 wherein said body is fabricated from material which has a memory.

13. An anchor fastener as set forth in claim 12 including at least one flange extending outwardly from the upper portion of said upper body portion.

14. An anchor fastener as set forth in claim 12 including a screw in said bore.

15. An anchor fastener as set forth in claim 14 wherein said legs are spaced closer to each other than the diameter of said screw.

16. An anchor fastener as set forth in claim 15 including at least one flange extending outwardly from the upper portion of said upper body portion.

17. An anchor fastener comprising a body having an upper body portion and a lower body portion secured to said upper body portion, said upper and lower body portions having a lateral dimension and a width dimension substantially perpendicular to said lateral dimension, a bore in said upper body portion, said lower body portion comprising first and second legs with a space therebetween, said bore being aligned with said space, outer surfaces on said legs, said outer surfaces having a lateral dimension which is larger than said width dimension, a screw in said bore, said legs being spaced closer to each other than the diameter of said screw, at least one flange extending outwardly from the upper portion of said upper body portion, and at least one strip extending inwardly into said bore from the side thereof.

18. An anchor fastener as set forth in claim 17 wherein a body is fabricated of high impact nylon with approximately 33 percent of glass fibers.

19. An anchor fastener as set forth in claim 18 wherein said glass fibers are approximately 0.0007 inches in diameter and are approximately 0.125 inches long.

20. An anchor fastener comprising a body having an upper body portion and a lower body portion secured to said upper body portion, said upper and lower body portions having a lateral dimension and a width dimension substantially perpendicular to said lateral dimension, a bore in said upper body portion, said lower body portion comprising first and second legs with a space therebetween, said bore being aligned with said space, outer surfaces on said legs, and said outer surfaces having a lateral dimension which is larger than said width dimension.

21. An anchor fastener comprising a body having an upper body portion and a lower body portion secured to said upper body portion, said upper and lower body portions having a lateral dimension and a width dimension substantially perpendicular to said lateral dimension, a bore in said upper body portion, said lower body portion comprising first and second legs with a space therebetween, said bore being aligned with said space, outer surfaces on said legs, said outer surfaces having a lateral dimension which is larger than said width dimension, and a plurality of strips extending inwardly into said bore from the side thereof.

22. An anchor fastener comprising a body having an upper body portion and a lower body portion secured to said upper body portion, said upper and lower body portions having a lateral dimension and a width dimension substantially perpendicular to said lateral dimension, a bore in said upper body portion, said lower body portion comprising first and second legs with a space therebetween, said bore being aligned with said space, outer surfaces on said legs, said outer surfaces having a lateral dimension which is larger than said width dimension, at least one of said outer surfaces being substantially planar, said body being fabricated from material which has a memory, and at least one strip extending inwardly into said bore from the side thereof.

23. An anchor fastener comprising a body having an upper body portion and a lower body portion secured to said upper body portion, said upper and lower body portions having a lateral dimension and a width dimension substantially perpendicular to said lateral dimension, a bore in said upper body portion, said lower body portion comprising first and second legs with a space therebetween, said bore being aligned with said space, outer surfaces on said legs, said outer surfaces having a lateral dimension which is larger than said width dimension, at least one of said outer surfaces being substantially planar, said body being fabricated from material which has a memory, and a plurality of strips extending inwardly into said bore from the side thereof.

24. An anchor fastener comprising a body having an upper body portion and a lower body portion secured to said upper body portion, said upper and lower body portions having a lateral dimension and a width dimension substantially perpendicular to said lateral dimension, a bore in said upper body portion, said lower body portion comprising first and second legs with a space therebetween, said bore being aligned with said space, outer surfaces on said legs, said outer surfaces having a lateral dimension which is larger than said width dimension, at least one of said outer surfaces being substantially planar, said body being fabricated from material which has a memory, and a screw in said bore, said screw having an outer diameter which is equal to the diameter of said bore.

25. An anchor fastener comprising a body having an upper body portion and a lower body portion secured to said upper body portion, said upper and lower body portions having a lateral dimension and a width dimension substantially perpendicular to said lateral dimension, a bore in said upper body portion, said lower body portion comprising first and second legs with a space therebetween, said bore being aligned with said space, outer surfaces on said legs, said outer surfaces having a lateral dimension which is larger than said width dimension, at least one of said outer surfaces being substantially planar, said body being fabricated from material which has a memory, a screw in said bore, said legs being spaced closer to each other than the diameter of said screw, at least one flange extending outwardly from the upper portion of said upper body portion, and at least one strip extending inwardly into said bore from the side thereof.

26. An anchor fastener comprising a body having an upper body portion and a lower body portion secured to said upper body portion, said upper and lower body portions having a lateral dimension and a width dimension substantially perpendicular to said lateral dimension, a bore in said upper body portion, said lower body portion comprising first and second legs with a space therebetween, said bore being aligned with said space, outer surfaces on said legs, said outer surfaces having a lateral dimension which is larger than said width dimension, at least one of said outer surfaces being substantially planar, and said body being fabricated from material which has a memory, said body being high impact nylon with approximately 33 percent of glass fibers.

27. An anchor fastener comprising a body having an upper body portion and a lower body portion secured to said upper body portion, said upper and lower body portions having a lateral dimension and a width dimension substantially perpendicular to said lateral dimension, a bore in said upper body portion, said lower body portion comprising first and second legs with a space therebetween, said bore being aligned with said space, outer surfaces on said legs, said outer surfaces having a lateral dimension which is larger than said width dimension, a screw in said bore, said legs being spaced closer to each other than the diameter of said screw, at least one flange extending outwardly from the upper portion of said upper body portion, and said body being fabricated of high impact nylon with approximately 33 percent of glass fibers.

* * * * *

UNITED STATES PATENT AND TRADEMARK OFFICE
CERTIFICATE OF CORRECTION

PATENT NO.     : 6,276,882 B1
DATED          : August 21, 2001
INVENTOR(S)    : Richard E. Young It is certified that error appears in the above-identified patent and that said Letters Patent is hereby corrected as shown below:

<u>Column 5, claim 7,</u>
Line 42, change "5" to -- 6 --.

Signed and Sealed this

Twenty-sixth Day of February, 2002

Attest:

Attesting Officer

JAMES E. ROGAN
Director of the United States Patent and Trademark Office